(12) United States Patent
England et al.

(10) Patent No.: US 7,478,235 B2
(45) Date of Patent: Jan. 13, 2009

(54) METHODS AND SYSTEMS FOR PROTECTING DATA IN USB SYSTEMS

(75) Inventors: Paul England, Bellevue, WA (US);
Kenneth D. Ray, Seattle, WA (US);
Marcus Peinado, Bellevue, WA (US);
John C. Dunn, Issaquah, WA (US);
Glen Slick, Bothell, WA (US); Bryan Willman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 10/187,259

(22) Filed: Jun. 28, 2002

(65) Prior Publication Data

US 2004/0003262 A1    Jan. 1, 2004

(51) Int. Cl.
*H04L 9/00* (2006.01)
*H04L 9/32* (2006.01)
*G06F 11/30* (2006.01)

(52) U.S. Cl. .................. 713/153; 713/189; 726/12
(58) Field of Classification Search ................ 713/189, 713/153; 726/12
See application file for complete search history.

(56) References Cited

U.S. PATENT DOCUMENTS 5,442,708 A * 8/1995 Adams et al. ............... 713/153
6,157,975 A 12/2000 Brief et al.
6,173,355 B1 1/2001 Falik et al.
2002/0143921 A1 * 10/2002 Stephan ...................... 709/223
2003/0177094 A1 * 9/2003 Needham et al. .............. 705/50

* cited by examiner

*Primary Examiner*—Christopher J Brown
(74) *Attorney, Agent, or Firm*—Lee & Hayes, PLLC

(57) ABSTRACT

The various embodiments described below are directed to providing authenticated and confidential messaging from software executing on a host (e.g. a secure software application or security kernel) to and from I/O devices operating on a USB bus. The embodiments can protect against attacks that are levied by software executing on a host computer. In some embodiments, a secure functional component or module is provided and can use encryption techniques to provide protection against observation and manipulation of USB data. In other embodiments, USB data can be protected through techniques that do not utilized (or are not required to utilize) encryption techniques. In accordance with these embodiments, USB devices can be designated as "secure" and, hence, data sent over the USB to and from such designated devices can be provided into protected memory. Memory indirection techniques can be utilized to ensure that data to and from secure devices is protected.

46 Claims, 7 Drawing Sheets

METHODS AND SYSTEMS FOR PROTECTING DATA IN USB SYSTEMS

TECHNICAL FIELD

This invention relates to methods and systems for protecting digital data and, more particularly, to methods and systems of protecting digital data in the context and environment of the universal serial bus (USB).

BACKGROUND

Data that resides on a computer can typically come under attack by individuals who wish to steal or modify the content in a number of different ways. One of the ways that data can be attacked is through the use of "rogue" software that can, for example, reside on the host computer. Typically, rogue software can attempt to access and manipulate the data when the data is stored on the computer (such as in local memory or on the hard disk), and/or "snoop" the data when it is transferred or moved about the computer to and from data destination or origination points such as devices that are connected to the computer.

One point of software attack can be the Universal Serial Bus (USB) that connects the computer to different devices such as a keyboard, mouse, speakers and the like. As some general background on USB, consider the discussion just below.

Universal Serial Bus (USB) is a standard peripheral interface for attaching personal computers to a wide variety of devices: e.g., digital telephone lines, monitors, modems, mice, printers, scanners, game controllers, keyboards, and other peripherals. In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus's topology. A USB hub provides USB attachment points for USB devices.

A USB function is a collection of one or more interfaces on a USB device that perform a given task. A function may have one or more configurations, each of which defines the interfaces that make up the device. Each interface, in turn, is made up of one of more end points.

An endpoint is the ultimate source, or sink, of data. An endpoint pipe provides for the movement of data between USB and memory, and completes the path between the USB host and the function endpoint.

Each endpoint is an addressable entity on USB and is required to respond to IN and OUT tokens from the USB host (typically a PC). IN tokens indicate that the host has requested to receive information from an endpoint, and OUT tokens indicate that the host is about to send information to an endpoint.

On detection of an IN token addressed to an endpoint, the endpoint is responsible for responding with a data packet. If the endpoint is currently stalled, a STALL handshake packet is sent. If the endpoint is enabled, but no data is present, a negative acknowledgment (NAK) handshake packet is sent.

Similarly, on detection of an OUT token addressed to an endpoint, the endpoint is responsible for receiving a data packet sent by the host and storing it in a buffer. If the endpoint pipe is currently stalled, at the end of the data transmission, a STALL handshake packet is sent. If the endpoint pipe is currently disabled, at the end of the data transmission, no handshake packet is sent. If the endpoint pipe is enabled, but no buffer is present in which to store the data, a NAK handshake packet is sent. A disabled endpoint, or endpoints not currently mapped to an endpoint pipe, do not respond to IN, OUT, or SETUP tokens.

It is assumed that the reader has some understanding of the USB. For a more detailed understanding and appreciation, the reader should reference the USB specification which is a publicly-available document.

This invention arose out of concerns associated with providing methods and systems for protecting data from software attacks on the USB.

SUMMARY

The various embodiments described below are directed to providing authenticated and confidential messaging from software executing on a host (e.g. a secure software application or security kernel) to and from I/O devices operating on a USB bus. The embodiments can protect against attacks that are levied by software executing on a host computer.

In various described embodiments, data can be protected via various processes that seize USB device addresses and devices. To seize a device address means that any data traffic to and from the given USB address below a seizing entity must come from or only go to, respectively, trusted software. Below the seizing entity traffic directed to a seized address must be validated as coming from trusted software, and above the seizing entity, any data originating from a seized address must be readable only by the trusted software. Seizing the device itself, thereby making the device solely controllable and readable with trusted software, merely requires appropriate use of seizing USB address.

In one embodiment, a secure functional component or module is provided and can be incorporated into a host controller, a hub, a USB-inline device, or function to effect seizure. The secure module can provide protection against observation and manipulation of all data "upstream" (i.e. closer to the PC) of the USB device. All "downstream" data is, therefore, in the clear. USB systems that have been secured in accordance with this embodiment can allow an encrypted tunnel to be established, between trusted software and an unmodified device, through an unmodified USB tree, and, for the most part, an unmodified USB device-driver stack. The tunneling can happen in both directions, e.g. a secure application can send data to a USB output device without risk of observation or meaningful interference and vice versa.

In other embodiments, USB data can be protected through techniques that do not utilized (or are not required to utilize) encryption techniques to effect seizure of USB addresses and devices. In accordance with these embodiments, USB devices can be designated as "secure" and, hence, data sent over the USB to and from such designated devices can be provided into protected memory. For instance if the seizing entity was implemented within the host controller itself it could redirect all DMA, to and from a seized address, to special memory only accessible from trusted software. A similar implementation could redirect all traffic, to and from a seized address, to special hardware, which only the trusted software can see, that is not a part of the regular DMA engine of a standard USB host Controller. In short any memory indirection techniques can be utilized to ensure that data to and from secure devices is protected.

DETAILED DESCRIPTION

Overview

Figure 1:
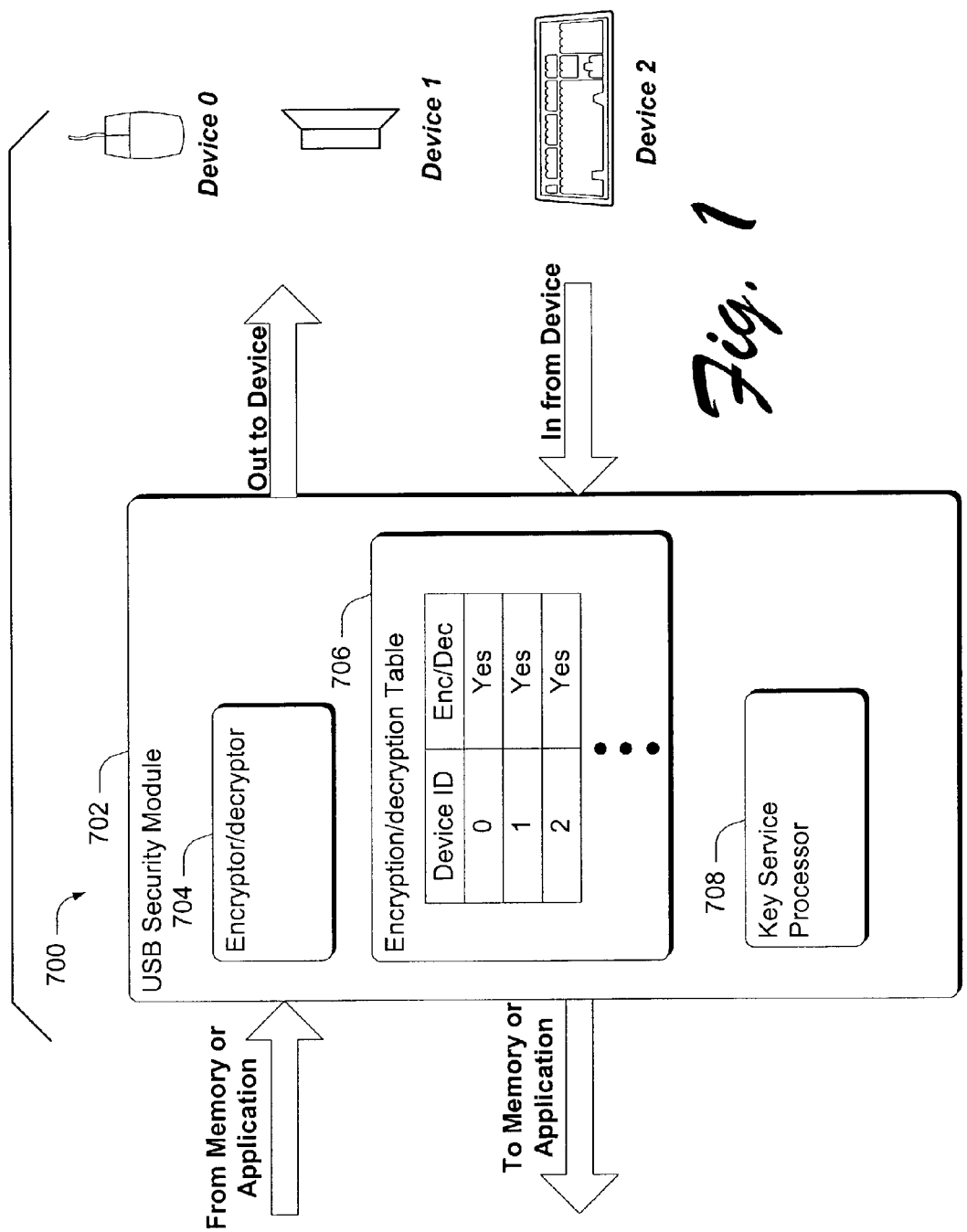
FIG. 1 is a block diagram of a USB Security Module in accordance with one embodiment.

The various embodiments described below are directed to providing authenticated and confidential messaging from software executing on a host (e.g. a secure software application or security kernel) to and from I/O devices operating on a USB bus. One goal for the architecture described below is to provide secure input and output between a host and USB devices without the possibility of intervention by viruses, Trojans, or other malicious software running on the host. Simple extensions of the design provide protection against some hardware attacks (e.g. bus-sniffers) and allow for secure tunneling all the way to an authenticated device, which may be appropriate for some premium-content applications.

The described methods and systems are attractive because they can allow useful levels of security to be applied to most legacy devices. For example, a legacy keyboard and USB-telephone handset can be plugged into a secure USB tree, and all input and output to and from these devices can be protected. In addition, the same secure functionality can be incorporated into devices themselves.

In various described embodiments, data can be protected via various processes that seize USB device addresses and devices.

In all cases there must be a secure path between the seizing entity and the trusted software. For instance, special hardware which only the trusted software can access could provide this channel, or if this channel must tunnel through an existing, untrusted USB stack, it must use some cryptographic protocol so that untrusted software can not disturb this channel.

To seize a device address means that any data traffic to and from the given USB address must only come from, or only go to, trusted software. Traffic originating above the seizing entity and directed to a seized address must be validated as coming from trusted software. Likewise, any data originating from a seized address must be readable only by the trusted software. To seize a device address, a seizing entity is provided with the particular address of the USB device that is to be seized.

To seize a USB device, three different steps are utilized. First, address 0 for the device is seized. This deals with the situation when a USB device is reset. If address 0 is not seized, it is possible for untrusted software to circumvent the seizing entity, as all USB devices revert to USB address 0 when reset. Second, the address of the USB device is seized. Seizing a USB device address ensures that its associated data is protected, as will become apparent below. Third, seizure of a device is effectuated by having some type of interaction or dialog with the user. This ensures that the particular USB device is in fact the device that it holds itself out to be, and that the user of the device is in fact the real user. Any suitable interaction or dialog can be used to accomplish this step. For example, the user interaction can be facilitated via entry of a pin or simple passphrase, or if there is a secure display path to the user, then a method can be used where the user is merely asked to type in the text show to him on the display. Thus, this step essentially answers the question of whether the user is presently associated with the USB device of interest.

In accordance with the inventive embodiments described below, a secure functional component or module is provided and can be incorporated into a host controller, a hub, a USB-inline device, or function to effect seizure. Conceptually, the secure module can provide protection against observation and manipulation of all data "upstream" (i.e. closer to the PC) of the USB device. All "downstream" data is, therefore, in the clear.

USB systems that have been secured in accordance with the inventive principles described below can allow an encrypted tunnel to be established through an unmodified USB tree, and, for the most part, an unmodified USB device-driver stack. The tunneling can happen in both directions, e.g. a secure application can send data to a USB output device without risk of observation or meaningful interference. This functionality can also be used for secure Internet telephony (e.g. to a USB audio device), secure commerce (to a USB display device), and the like. In the input direction, a secure application can obtain keystrokes, mouse packets, secure biometric data, microphone data, and the like from USB devices.

Described below are two approaches for protecting data in a USB system. The first approach is an encryption approach and is described in the section entitled "Protection Via Encryption." The second approach, which can also effect seizure, is an alternative to encryption and is described in the section entitled "Protection Via Encryption Alternatives." In the sections that follow, an exemplary computer environment that is suitable for use in implementing various inventive aspects is described. The discussion then concludes with the two aforementioned sections describing the two approaches for protecting data in a USB system.

Exemplary Computer Environment

Figure 2:
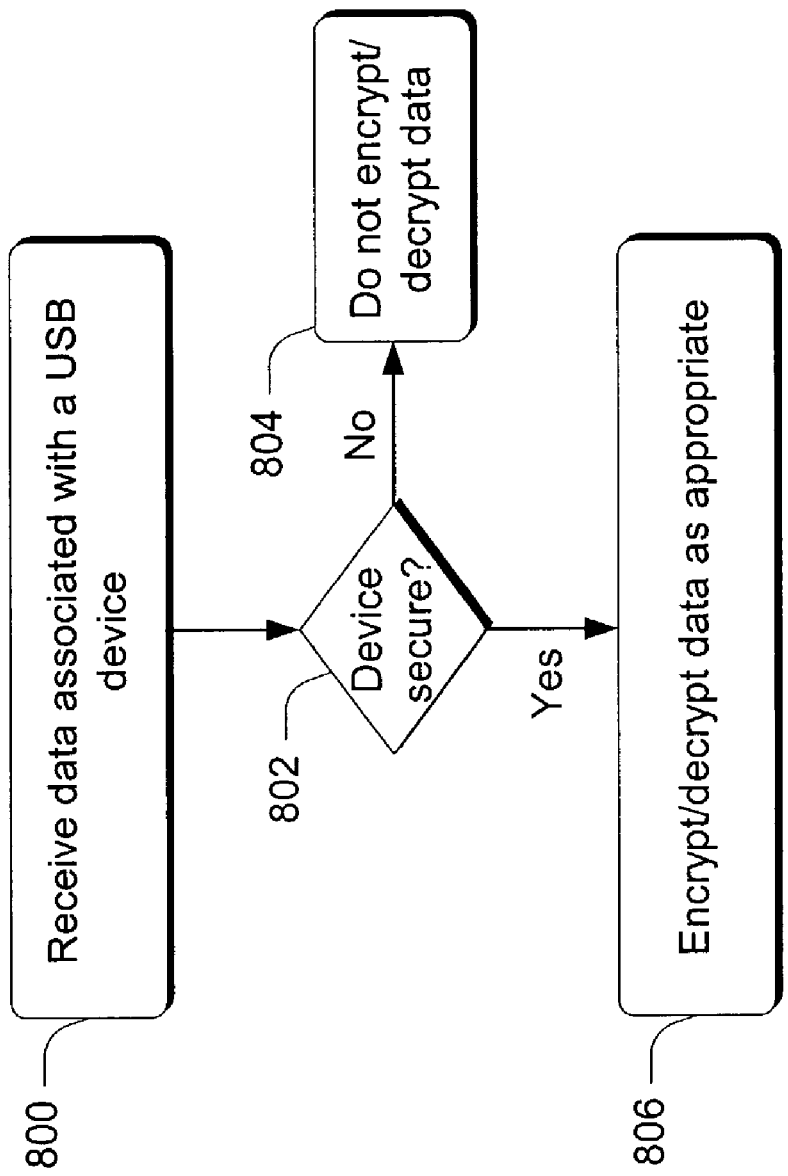
FIG. 2 is a flow diagram that describes steps in a method in accordance with one embodiment.

FIG. 2 illustrates an example of a suitable computing environment 200 in connection with which the system and related methods described below can be implemented. The computing environment 200 can serve as a host for the USB protection techniques that are described below.

It is to be appreciated that computing environment 200 is only one example of a suitable computing environment and is not intended to suggest any limitation as to the scope of use or functionality of the media processing system. Neither should the computing environment 200 be interpreted as having any dependency or requirement relating to any one or combination of components illustrated in the exemplary computing environment 200.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 2, computing system 200 is shown comprising one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM) and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., multimedia application program 224), other program modules 218, and program data 220. A user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter or video/graphics card 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer.

As shown in FIG. 2, computing system 200 is communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Seizing Addresses and Devices

As noted above, data can be protected by seizing USB device addresses and USB devices. In the discussion below, various techniques are described that can be used to seize device addresses and devices. These techniques include encryption techniques and encryption alternatives (such as via sideband hardware or by direct memory accesses). Seizure can also take place via different seizing entities, e.g. in the host controller, in an in-line device between the host controller and the USB device to be seized, or in the device itself.

One of the advantages of seizing USB devices is that seizure can take place without the device even knowing that it has been seized for purposes of making it secure. Additionally, USB devices can be seized regardless of the type of device it is. Through the techniques described below, control of a USB device can be achieved without having to do a great deal of work on the device itself. This is advantageous because, in some embodiments, the inventive techniques can be employed in the context of regular USB devices without requiring the devices to be modified.

Recall from the above discussion that to seize a device address means that any data traffic to and from the given USB address below a seizing entity must come from or only go to, respectively, trusted software. Below the seizing entity traffic directed to a seized address must be validated as coming from trusted software, and above the seizing entity, any data originating from a seized address must be readable only by the trusted software. Or said another way traffic originating above the seizing entity and directed to a seized address must be validated as coming from trusted software. Likewise, any data originating from a seized address must be modified so that it is readable only by the trusted software.

Protection Via Encryption

FIG. 1 is a block diagram that describes aspects of an exemplary system 700 that can be utilized to protect data in a USB system. System 700 comprises a USB Security Module 702 that includes an encryptor/decryptor component 704, and encryption/decryption table 706, and a key service processor 708.

Encryptor/decryptor component 704 functions to encrypt or decrypt data that travels over the USB. Component 704 can be provided at any suitable point such that there is no programmatic access beyond encryptor/decryptor component 704 where data typically resides in unencrypted form. Typically, the way that USB Security Module 702 works is that when data is received from a USB device (e.g. keystrokes from a keyboard or input from a mouse), if appropriate, the data can be encrypted so that in the event the data is acquired by rogue software, the encrypted data is of no practical use to the software. Such data can then typically be provided into memory and/or utilized by, for example, a secure software application. Since the data is encrypted while in memory, the data is protected from rogue software. Similarly, for data traveling in the other direction (i.e. out to a USB device such as a speaker), the data can, while in the host, be encrypted so that it is of no practical use to any rogue software that might acquire it. When the data is sent from the host to a USB device, the USB Security Module 702 can see to it that the data is decrypted before it is sent to the device. Again, encryption and decryption takes place at a point in the system where there is no programmatic access to the data.

As noted above, USB devices are identified by a device ID. The device IDs are established in concert by the driver software and the USB Host Controller applying device IDs to devices that are attached to the host controller. So, in the present example, three devices are shown—a mouse bearing device ID 0, a speaker bearing device ID 1, and a keyboard bearing device ID 2. Hubs are also provided with device IDs—although this is not specifically depicted in the figure. Table 706 is provided and enables one or more of the USB devices that might be connected to a USB Host Controller to be protected. Specifically, notice that table 706 includes a column designated "Device ID" and a column designated "Enc/Dec". Table 706 provides the capability to individually program or define which devices are to be protected by the encryptor/decryptor component 704. That is, encryption/decryption can be applied to USB devices on a device-by-device basis. For example, notice that for each of the device IDs, the corresponding "Enc/Dec" entry indicates that encryption or decryption is to occur. So, in the case of the keyboard (device 2), when a stream of keystrokes is received from the keyboard, the data will be encrypted and thus protected. Similarly, when a stream of encrypted data (such as might be generated by a secure audio application) is intended to be sent to the speaker (device 1), the data will be decrypted.

To effectuate encryption and decryption, key service processor 708 can provide an interface that can be called using a secure channel to set up which devices are secure and what the proper key(s) for the device should be. Any suitable encryption/decryption techniques can be utilized. Exemplary encryption/decryption implementation examples are provided in the section below entitled "Exemplary Encryption/Decryption Techniques".

FIG. 2 is a flow diagram that describes steps in a method for protecting data in a USB system in accordance with one embodiment. The method can be implemented in any suitable hardware, software, firmware or combination thereof. In the illustrated example, the method can be implemented in connection with a USB Security Module such as the one shown and described in connection with FIG. 1.

Step 800 receives data that is associated with a USB device. This step can be performed by any suitable entity. Advantageously, this step can be implemented by an entity at which there is no programmatic access and hence, the data is protected from software access by, for example, rogue applications. Examples of such entities are provided below. Step 802 determines whether the associated USB device is indicated as being secure, i.e. whether the device has been seized. That is, this step can ascertain whether it is desirable to maintain transactions with the USB device secure. In the example above, this step can be implemented by providing a table that indicates, for each particular USB device, whether transactions with that device are intended to be kept secure. If transactions are not intended to be kept secure, then step 804 does not encrypt or decrypt the data. Such might be the case where, for example, an unsecure software application executing on the host produces unsecure data, or is to receive unsecure data from a USB device. If, on the other hand, step 802 determines that the device is secure (or has been seized) insofar as the transaction with the device is to be kept secure, then step 806 either encrypts or decrypts the data as appropriate. Specifically, if the data is enroute to a USB device (such as encrypted data that is generated by a secure software application), then step 806 can decrypt the data. Likewise, if the data is enroute from a USB device and is intended for a secure application, then the data can be encrypted and subsequently provided to the application and/or into memory.

As noted above, USB Security Module 702 (or individual components thereof) can be located at any suitable entity in a USB system. It is desirable and advantageous to locate the module at a point where there is no programmatic access to the data. Accordingly, the module can be located at a USB device or function, an in-line device or "dongle", a USB Hub, or the USB Host Controller. Table 1 immediately below summarizes the protected path and unprotected path characteristics for each of the possible locations:

TABLE 1

| Module Location | Protected Path | Unprotected Path |
| --- | --- | --- |
| Within the device as a separate Interface | All data to and from the protected device on external buses can be protected all the way to the Application | There may remain internal data paths that are unprotected. Obtaining data will typically involve opening the device. |
| In-line device or "dongle" | All data to and from devices attached downstream from the dongle either directly or via intervening hubs can be protected. | All devices attached upstream from the dongle are unprotected. |

TABLE 1-continued

| Module Location | Protected Path | Unprotected Path |
| --- | --- | --- |
| USB Hub | All data to and from devices attached to the Hub directly or via intervening downstream hubs can be protected. | All devices attached to upstream hubs are not protected. |
| USB Host Controller | All data to and from all devices in the system can be protected from all software attacks. | All traffic on all external USB buses is unprotected. |

Some observations that are gleaned from Table 1 are as follows. The closer that the USB Security Module is to the host or computer, the more devices can be protected against software attack at a lower cost. However, there is no meaningful protection against hardware snooping on the USB bus. Further, if the USB Security Module is incorporated into a device, then all data traffic to and from that device on external buses is protected. For most general security applications, the USB Security Module should reside in the USB Host Controller, or on the motherboard. For protection against hardware attacks, and for some DRM-applications, the USB Security Module can be incorporated into device hardware.

Exemplary Encryption/Decryption Techniques

In the context of USB systems, there are certain timing requirements that must be met in order for the USB to function properly. Hence, in selecting an encryption/decryption approach or technique, it is important to be sensitive to these timing requirements and select a technique that does not introduce an unacceptable delay into the system.

It is desirable to strive for a minimal packet delay for encryption and decryption operations. Hence, acceptable delays should fall within acceptable hub delays (e.g. 36 bits, or approximately 4 bytes). Logically, this leads in the direction of using stream ciphers for encryption and decryption.

Stream ciphers typically operate by generating a keyed, pseudo-random sequence, and XORing the output of the sequence with the data to be encrypted or decrypted. With certain assumptions, encryption or decryption can take place with approximately one XOR gate delay. It is also possible to batch into bytes and re-serialize, thus making the delay approximately one byte.

The PRNG can cycle with a clock time derived from the USB data clock. It is also important to be able to synchronize this with the host-based software that is performing the complementary encryption or decryption. Additionally, it is important that the security kernel and the USB secure device initially share a key $K_0$. It can also be important for the stream-ciphers to re-synchronize in the event of data loss. That is, any damage caused by a synchronization error can thus be limited in time.

A counter that is derived from SOF packet frame-number fields can be used to generate per-frame encryption and decryption keys. It is important, in this regard, that encryption keys are only used once by stream ciphers. This present a couple of technical difficulties that should be overcome: (1) the frame-number field is only 11 bytes and cycles every 2 seconds, and (2) on high-speed buses, the same frame-number is sent for 8 consecutive frames.

To address these concerns, each secure USB device can derive a 64 counter $C_{FRAME}$ that can be set programmatically, where:

| Bits 63-14 | Bits 13-4 | Bits 3-0 |
| --- | --- | --- |
| Count of "carries" from frame-counter field | Frame-counter field for the current frame. | Counter maintained by the USB-SEC device of micro-frames within the current frame |

Practically, this 64 bit counter counts frames monotonically. This key can be used to derive two frame-keys for the encryption and decryption operations for each frame. Any suitable one-way function can be used. For example:

$K_{ENC}$=SHA ($K_0$ cat $C_{FRAME}$ cat "ENC")

$K_{DEC}$=SHA ($K_0$ cat $C_{FRAME}$ cat "DEC")

Key generation and stream-cipher initialization can happen in parallel with other encryption or decryption operations. This is because the stream cipher should be ready to run with very little warning. An appropriate stream cipher, such as RC4, can be used.

Assume now that the stream cipher is primed and ready to run at the start of each micro-frame. Further, assume that encryption is required for some specified subset of data packets associated with IN and OUT transactions.

The secure USB device can thus be responsible for examining IN and OUT packet requests originating from the host-controller, and filtering those that require security based on programmed state. If a transaction request that needs security is detected, the resultant DATA packet can be encrypted (IN transaction) or decrypted (OUT transactions).

Encryption can thus occur by advancing the appropriate PRNG for each byte encrypted or decrypted and XORing the incoming data bytes. The encrypted data is shifted out of the secure USB device, and a new CRC is written. If further transactions that require security occur in the same micro-frame, the stream-cipher continues without reset. At the end of the micro-frame, the stream-cipher is reset to use the next frame key. Encryption and decryption operations can thus occur in a small fraction of the frames.

Data Authentication

Another feature of one or more embodiments is the ability to put in place measures that can be used to protect the integrity of the data that is provided onto the USB. This can be done by adding authentication data to the data that is normally passed over the USB. The authentication data can then be used to authenticate the data that is normally passed over the USB.

For example, the stream cipher described above provides strong privacy protection for data, but provides no explicit protection against data being replaced or manipulated by an adversary. Hence, an adversarial operating system might replace OUT data (which would thus be decrypted by the USB Security Module to random bits) or might replace IN data which would then be processed to yield random bits.

For many applications, however, authentication data is not required. For example audio input and output cannot be usefully attacked by replacing sample data. However, other devices may have vulnerabilities—especially those that return small interrupt-response packets.

To allow security applications and kernels to detect and respond to data-replacement attacks the USB Security Module can collect authentication data for the data that passes through it. For example, the USB Security Module can compute a hash of the data or a CRC can be associated with the data so that if the data is changed, such changes can be detected.

Associating authentication data with the data that normally flows over the USB can be accomplished in any suitable way using any suitable techniques given the processing requirements of the USB system. As an example, consider the following.

To allow for the detection of data-replacement or manipulation attacks, authentication data can be collected on individual micro-frames that use the security facilities. Ideally, this authentication data would be issued as part of the encrypted data transaction. This typically is not possible without increasing the size of the data payloads and thus possibly running over frame-boundaries. To address this situation, authentication data can be maintained by secure USB devices and read in during a later USB transaction directed at the secure USB device itself. For example, the authentication data can comprise a hash of the plain-text of all data sent in a given frame, encrypted with the stream cipher for that frame. The responsibility of scheduling transactions appropriately, if authentication data is required, can thus be placed on the USB driver software.

Thus, in this example, the authentication data can be appended to the USB data. Alternately, the authentication data can be generated, stored in an appropriate location, and queried at some later time.

For data that is being provided over the USB to a USB device, data verification can take place in the USB Security Module. This can take place by decrypting the data, verifying the data, and then sending the data out to the USB device. For data that is being provided from a USB device to a secure application, the USB Security Module or the USB device itself can generate the authentication data. The secure application on the host or some security kernel on the host can then verify the integrity of the data.

Switching Between Secure and Unsecure Software Stacks

In most cases, devices on the USB are shared between many different applications—some of which are secure and others of which are not secure. It is important to integrate the USB security into a system in such a way that both unsecure applications can access data from and generate data to USB devices, and secure applications can access data from and generate data to USB devices in a manner that is generally unobtrusive, yet protects data when the data is indeed in need of protection.

Exploiting USB security in accordance with the embodiments described above can be accomplished by changing some of the lower-level USB device drivers and, in at least some cases, migrating some of the upper-level drivers to trusted-space, thus securing them. Further, measures can be put in place to facilitate appropriate packet routing to a device between trusted and normal (i.e. untrusted) space.

Figure 3:
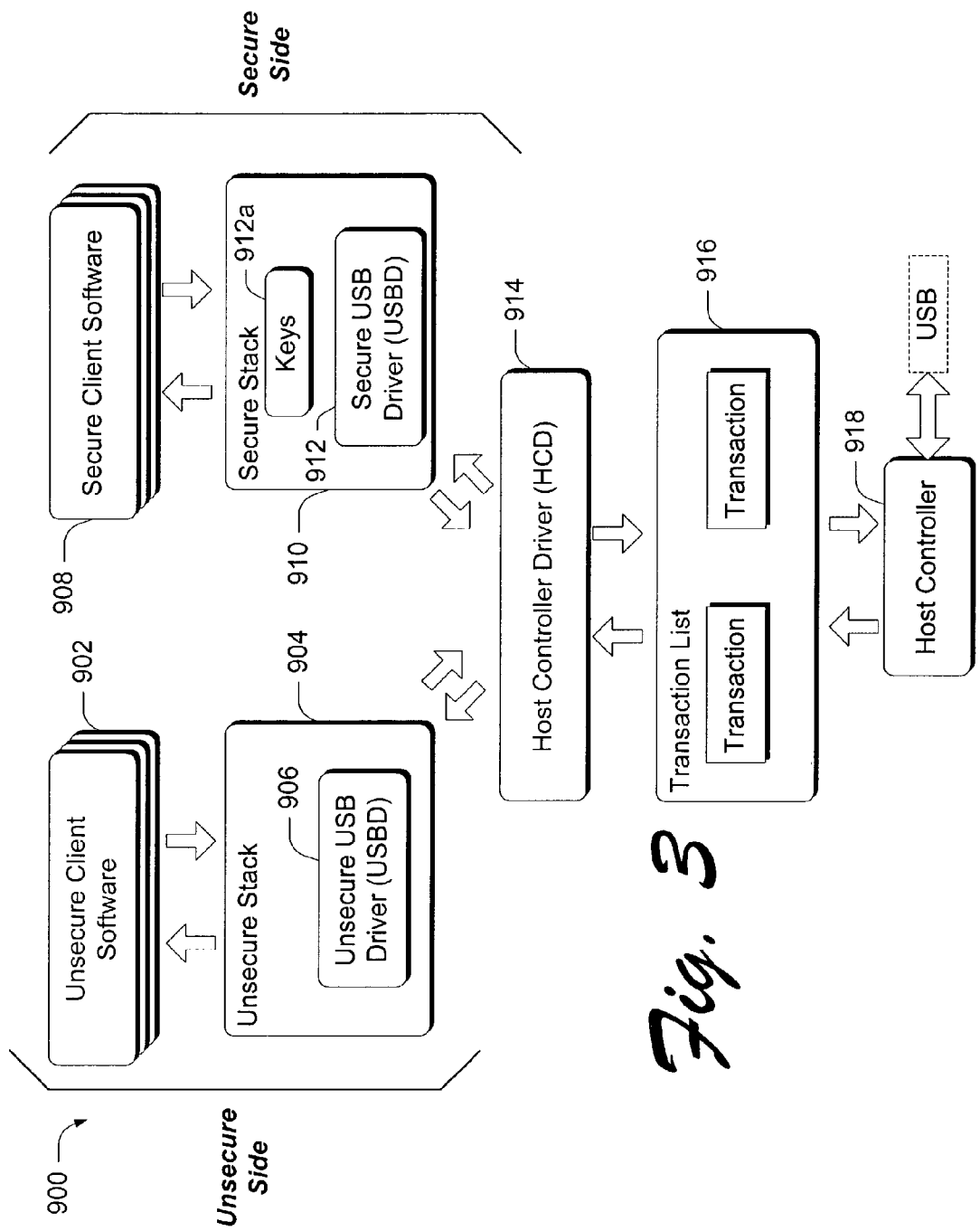
FIG. 3 is a block diagram that illustrates aspects of one or more embodiments that are suitable for encryption-protecting data.

As an example, consider FIG. 3 which shows a system 900 that can permit the processing of data in both a secure and unsecure mode. In this example, an unsecure side of the host comprises one or more unsecure client applications 902 and an unsecure software stack 904 that comprises one or more unsecure USB drivers 906. A secure side of the host comprises one or more secure client applications 908 and a secure software stack 910 that comprises one or more secure USB drivers 912 and one or more keys 912a for encrypting/decrypting data. Keys can also be located with or accessible by the secure software applications 908. Drivers 912 can be secured by, for example, migrating the drivers to a trusted space. Rounding out system 900 is the Host Controller Driver 914, transaction list(s) 916 containing various transactions, and Host Controller 918. Data that is intended to used by secure client applications can be stored in a secure region of memory that is inaccessible to untrusted entities.

For data that is being written out to a USB device, the data is typically filtered down from an application, through a software stack including one or more drivers, through the Host Controller Driver which generates transactions and organizes them for manipulation by the Host Controller 918. The Host Controller 918 then takes the transactions and generates bus activity via packets to move function-specific data across the bus for each transaction.

For data that is being output from a USB device, the data is typically filtered up through the Host Controller 918, Host Controller Driver 914 and through a software stack for use by a client application.

In one embodiment, encryption/decryption is provided on a per function or per device basis. In this example, the Host Controller Driver 914 can be programmed by, for example, a secure software application or software within the secure stack 910, such that for any particular USB device, data that is intended for that device or received from that device is routed through the secure stack 910. This is referred to as a "secure mode". In this way, data that is intended to be secure can be protected. For example, data that is received from a USB device that has been encrypted by the USB Security Module can be routed up the secure stack, decrypted and utilized by the secure client application. For data that is not intended to be protected, such as that which is intended for or received from an unsecure application, routing can take place by the Host Controller Driver 914 via the unsecure stack 904.

System 900 can also operate in an "unsecure mode". In the unsecure mode, a couple of different things can occur.

For example, in the unsecure mode, an unsecure software application is to either generate data for a USB device or receive data from a USB device. If the USB device has been secured such that its data is encrypted by the USB Security Module, then if the unsecure software application has "focus" (i.e. the data is intended to be routed for use by the unsecure software application), the data can be decrypted and placed into the normal transfer descriptor (i.e. transaction list 916) for normal operating system processing.

Alternately, when an unsecure application is determined to have focus, the Host Controller 918 can be notified that encryption/decryption is not to be applied. Similarly, when a secure application is determined to have focus, the Host Controller 918 can be notified that encryption/decryption is to be applied. Switching between having encryption/decryption and not having encryption/decryption can be effectuated by making table entry adjustments to table 706 (FIG. 1).

The embodiments described above can protect data that is to be transmitted over the USB using encryption techniques. It is also possible to protect USB data using techniques other than encryption. In the section that appears immediately below, different techniques for protecting USB data using encryption alternatives are described.

Protection Via Encryption Alternatives

Figure 4:
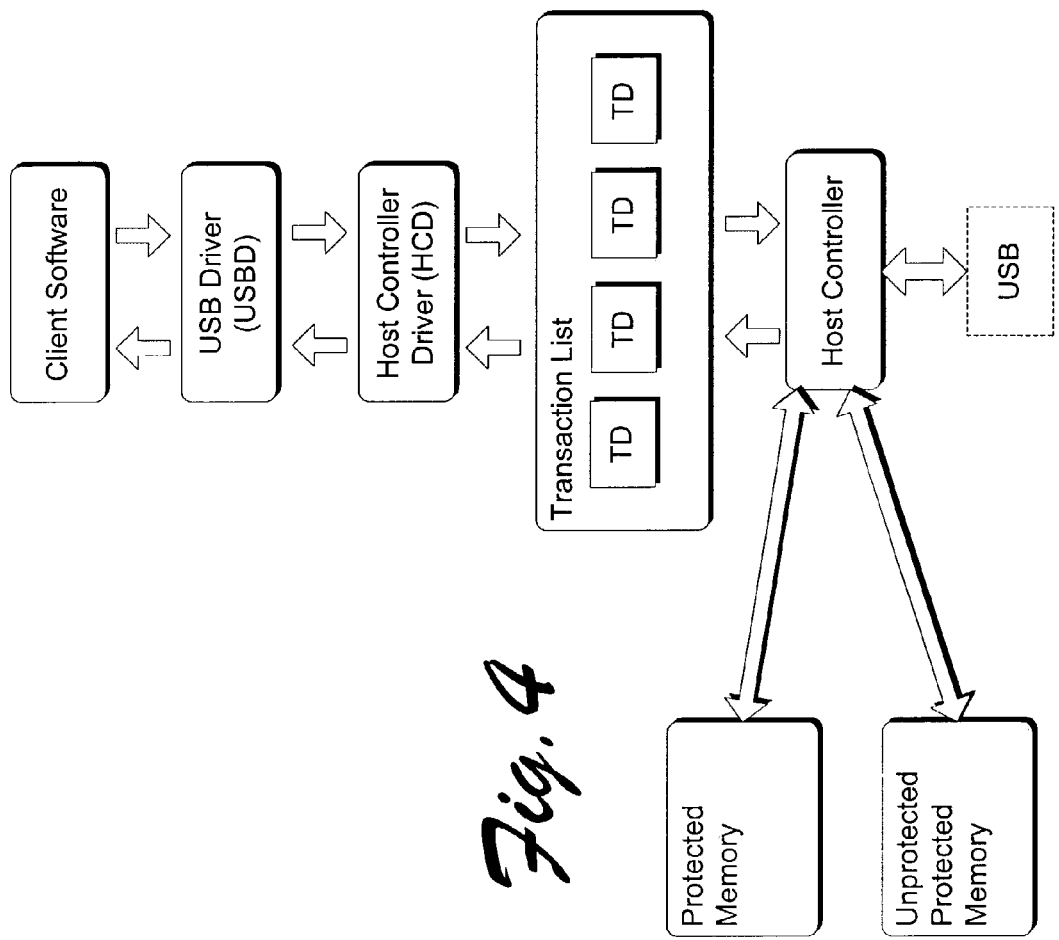
FIG. 4 is a block diagram that illustrates aspects of one or more embodiments that are suitable for protecting data using techniques other than encryption.

Typically, when data is processed by USB systems, the data is provided into normal, unprotected processor memory. In accordance with the embodiments described below, memory is partitioned into protected or secure memory and unprotected or unsecure memory. USB devices or functions are then designated as "secure" or "unsecure". For devices that are designated as "secure" (or which have effectively been seized), associated data is provided into and manipulated from protected memory. For devices that are designated as "unsecure" (or which have not been seized), associated data is provided into and manipulated from unprotected memory. As an example, consider FIG. 4 which depicts protected and unprotected memory. There, the USB Host Controller is configured to read and write data respectively from and to protected memory for USB devices that are designated as "secure". For USB devices that are designated as "unsecure" or not designated as "secure", the USB Host Controller is configured to read and write data respectively from and to unprotected memory.

In order to implement this type of arrangement, some allocation of memory indirection can be used so that, for secure devices, protected memory is used and for unsecure devices, unprotected memory is used. How to implement the particular type of memory indirection can be specific to the type of operating system in connection with which the USB system is employed.

A desirable implementation goal is that traffic to and from secure devices is busmastered to protected memory. This means that the USB Host Controller should be given privileged access to protected memory that would otherwise be inaccessible to DMA devices. Another desirable implementation goal is that the USB Host Controller should not use protected memory for any other USB devices other than those identified as "secure."

These goals then define some desirable characteristics of the protected memory that is to be used for protecting USB data. First, the protected memory should be inaccessible to untrusted entities. Second, the protected memory should be accessible only to trusted entities. Third, the protected memory should not be available to other DMA devices.

Figure 5:
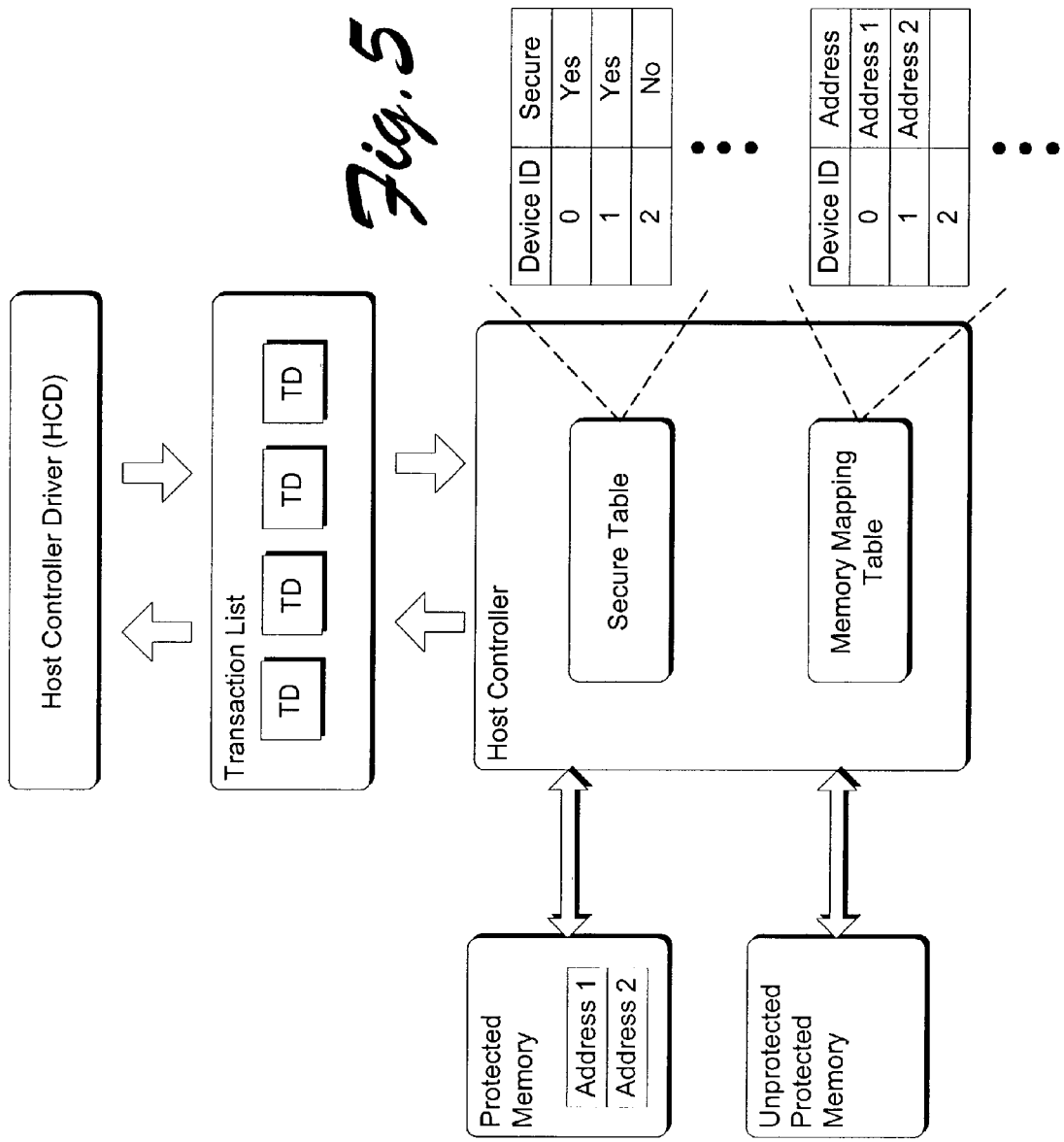
FIG. 5 is a block diagram that is help in understanding one or more embodiments that utilize the concept of protected memory to protect USB data.

FIG. 5 is a block diagram that illustrates the Host Controller Driver and USB Host Controller in somewhat more detail, in accordance with one embodiment.

The USB Host Controller Driver typically converts I/O Request Packets (IRPs) to and from transactions (i.e. "transfer descriptors" or simply "TDs") and organizes them for manipulation by the Host Controller. The TDs typically comprise a large tree of linked lists. The Host Controller takes the transactions and generates bus activity via packets to move function-specific data across the bus for each transaction.

Transfer descriptors are simply instructions to the USB Host Controller to undertake some activity relative to a particular USB device. Transfer descriptors typically contain a device address or ID, an end point address, and a pointer to physical memory. In accordance with this embodiment, the Host Controller includes or has access to a secure table that defines, for particular device IDs, which devices are secure (or have been seized). In the FIG. 5 example, the secure table includes a column that contains device IDs and a column that contains an associated indication of whether that particular device is secure. In this particular example, devices 0 and 1 are indicated as secure, while device 2 is indicated as not secure. The Host Controller also includes or has access to a memory mapping table (which may or may not comprise part of the secure table). The memory mapping table includes entries, for secure devices, that map to memory addresses in the protected memory that can be used for data associated with that particular secure device. Thus, in this particular example, device 0 maps to "Address 1" in the protected memory, while device 1 maps to "Address 2" in the protected memory. Notice that the protected memory includes portions that correspond to "Address 1" and "Address 2."

Thus, the secure table and the memory mapping table indicate for any particular USB device, whether the device is associated with a protected portion of memory. If the device is associated with a protected portion of memory, then any data provided to or received from that device is stored in the associated protected memory portion. Accordingly, if any entities transmit data to a secure device, the particular memory address in the protected memory associated with the secure device should be used. Thus, the Host Controller is configured to copy data into and out of portions of protected memory that are associated with devices that are indicated to be secure. The Host Controller can use direct memory access (DMA) to access the protected memory portions. This is advantageous because the structure of the TD's need not be changed in order for data to be protected.

Additionally, secure USB devices are protected in that communication to and from the devices takes place via secure memory in a manner that is controlled by the Host Controller. That is, entities cannot directly send packets to the secure USB devices. They can simply only instruct, via the appropriate TDs, the USB Host Controller to communicate with a particular protected device. The Host Controller can then filter and process the TDs to ensure that only authorized communications take place between the protected memory addresses and the associated secure USB device.

Similarly, communications can be set up (via TDs) to other possibly unsecure devices from a particular protected memory address, but the Host Controller will not let the communications go through. Likewise, communications can be set up (via TDs) between a particular secure device and a different memory location (e.g. an unprotected memory location), but again, the Host Controller will not let the communication go through. That is, the Host Controller can serve as the ultimate gate keeper to ensure that secure devices and their associated protected memory addresses are protected.

One important advantage embodied in this approach is that the driver software can remain essentially unchanged.

Figure 6:
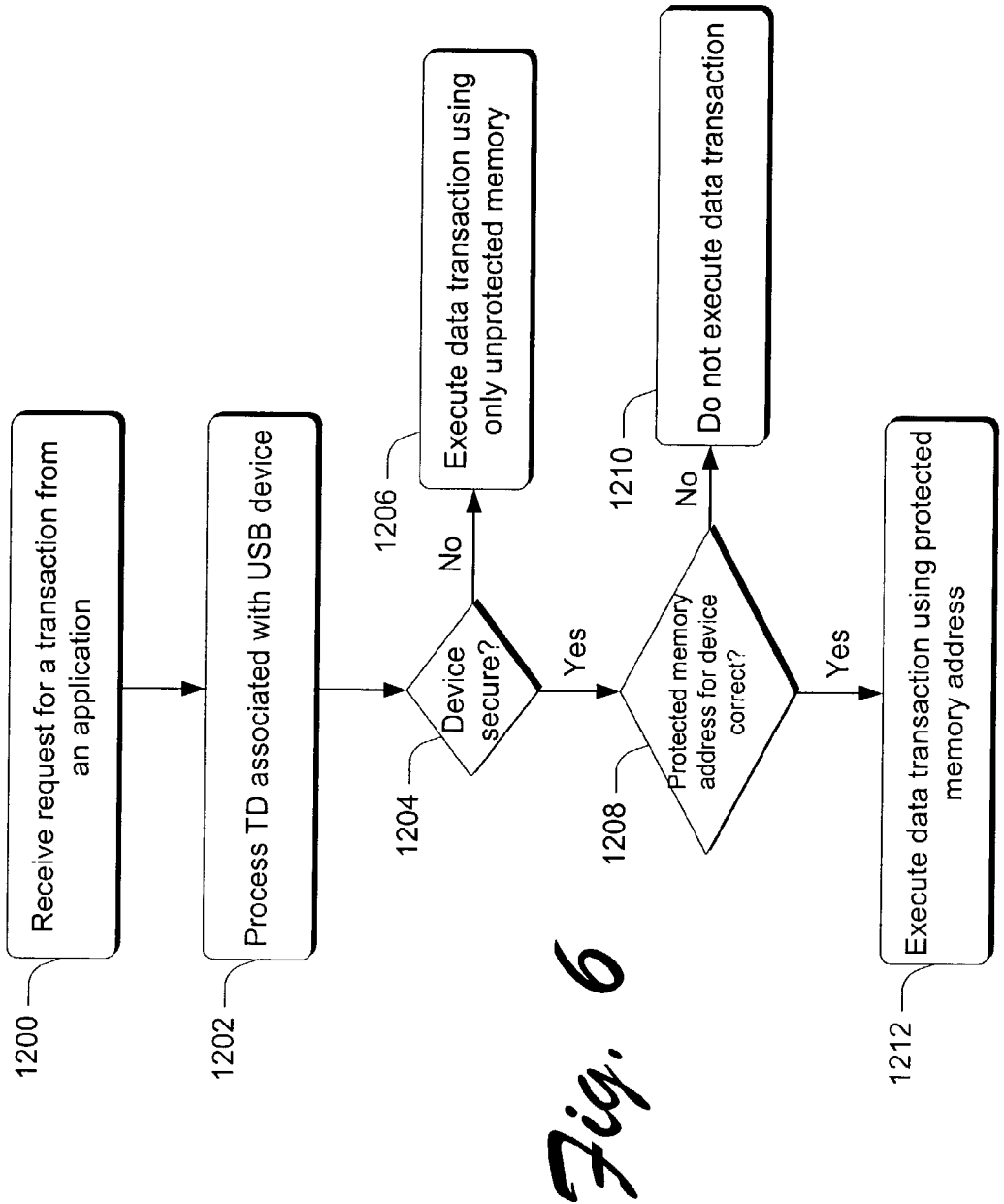
FIG. 6 is a flow diagram that describes steps in a method in accordance with one embodiment.

FIG. 6 is a flow diagram that describes steps in a method in accordance with one embodiment. The method can be implemented in any suitable hardware, software, firmware or combination thereof. In the present example, the method can be implemented by a suitably configured Host Controller.

Step 1200 receives a request for a transaction from a client application. The application can be either a secure application or an unsecure application. Typically, a driver in the stack will receive the request and then query the application for a memory location that is to be the subject of the transaction. If the application is a secure application, then the application can return a memory location that corresponds to the protected memory. If the application is not a secure application, then it will not know of the protected memory locations. The driver (whether trusted or not), can then simply process the memory address that it receives by providing it into a TD—completely oblivious that the memory address is that which is associated with protected memory.

Step 1202 processes a transfer descriptor (TD) associated with a USB device and which contains a memory address. Step 1202 ascertains whether the USB device is secure. This step can be implemented by, for example, accessing a table that describes which devices are secure, such as the secure table of FIG. 5. If the device is not secure, then step 1204 can execute a data transaction (either a "read" or "write" operation) using only unprotected memory. This can prevent an unsecure device from accessing protected memory. For example, if the TD that is received pertains to an unsecure device yet contains a memory address for the protected memory, then the Host Controller can refuse to execute the transaction.

If, on the other hand, the device is secure, then step 1208 determines whether the protected memory address for the device is correct. The protected memory address is typically included in the TD. This step can be implemented by accessing a memory mapping table such as the table shown in FIG.

5. If the protected memory address is not correct, then step 1208 does not execute the data transaction. If, on the other hand, the protected memory address for the secure device is correct, then step 1210 executes the data transaction using the protected memory address. Again, execution of the data transaction can involve reading data from the protected memory or writing data to the protected memory. This step can be implemented using direct memory access (DMA) techniques.

The processing techniques described above can protect the confidentiality of the data that is associated with secure USB devices. Advantageously, this method can be implemented in connection with various stack drivers (such as the Host Controller Driver) and other software that need not be secure. The USB device drivers can be modified somewhat in order to support this operation. For example, the device drivers can be modified to know that if it is dealing with a device that has been secured, then it should get its memory locations from protected memory and not unprotected memory.

Additional measures can be implemented to ensure, to a desirable degree, the integrity of the data. Specifically, the above techniques can be used to ensure that the TDs are utilized in such a manner that only authorized and appropriate data transactions take place. It is possible, however, for TDs to be shuffled, manipulated or deleted to thus prevent the system from getting data that is should otherwise have received.

Figure 7:
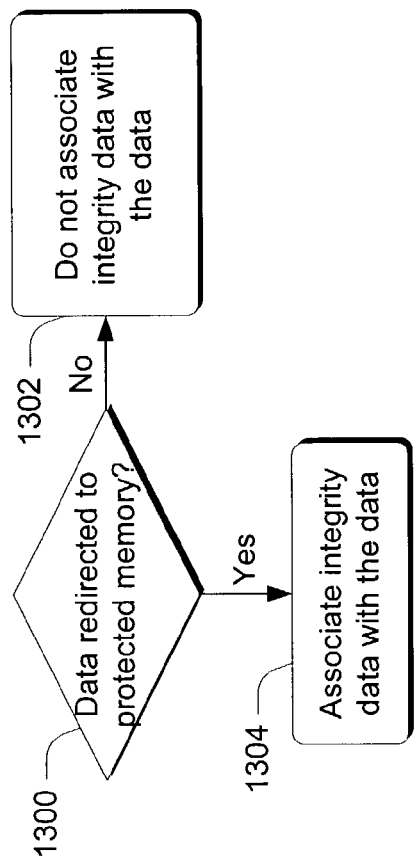
FIG. 7 is a flow diagram that describes steps in a method in accordance with one embodiment.

FIG. 7 is a flow diagram that describes steps in a method in accordance with one embodiment. The method can be utilized to provide a degree of confidence in the integrity of the data that is provided into protected memory. The method can be implemented in any suitable hardware, software, firmware or combination thereof. In the present example, the method can be implemented by a suitably configured Host Controller.

Figure 8:
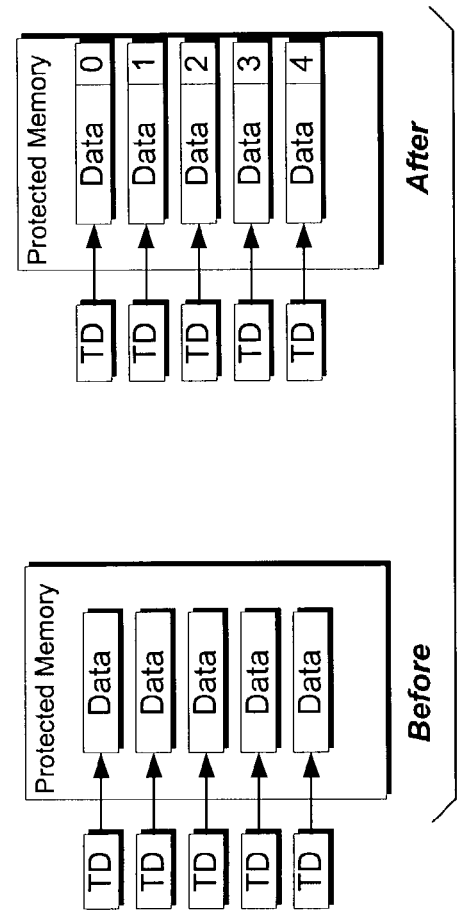
FIG. 8 is a block diagram that illustrates aspects of one embodiment that can provide integrity-protected data.

Step 1300 determines whether data is to be redirected to the protected memory. Any suitable technique can be utilized. For example, when the Host Controller processes TDs, the TDs can include the memory address in the protected memory to which the data is to be redirected. If step 1302 determines that the data is not to be redirected to protected memory, then step 1302 does not associate integrity data with the data or data packets that are processed. If, on the other hand, step 1300 determines that data is to be redirected to protected memory, then step 1304 associates integrity data with the data or data packets that are redirected into the protected memory. Any suitable techniques can be utilized to associate the integrity data with the data packets. In addition, any suitable type of integrity data can be utilized for association with the data packets. As an example, consider FIG. 8.

There, a portion of protected memory is shown and designated as "Before" and "After". The portion of protected memory depicted as "Before" constitutes a configuration that can exist without the use of integrity data. Specifically, a numbers of TDs are shown, each pointing to a particular memory address in the protected memory that contains data associated with that TD. In the "After" view, each TD likewise points to a particular memory address in the protected memory. Here, however, integrity data has been associated with the data in the protected memory. In this particular example, the integrity data comprises a counter having a counter value. The counter is appended to each of the data packets. In this example, the counter is a monotonically increasing counter. In the event that a data packet is removed or shuffled by, for example, an untrusted driver, the Host Controller will immediately know when it processes the data packet.

CONCLUSION

The above-described methods and systems provide various approaches that can be used to protect data that is to be provided over a Universal Serial Bus. The protective methods can protect against software attacks by rogue software that might be executing on a user's computer. The approaches provide flexibility in that encryption techniques and non-encryption techniques can be used.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
    a memory;
    a processor coupled to the memory;
    a USB security module configured to process data associated with USB transfers and to determine if one or more USB devices have been seized, wherein seizing indicates that data traffic associated with a USB device must be associated with trusted software and establishing a secure tunnel to send the data traffic to and from the one or more USB devices, and wherein steps utilized to seize the one or more USB devices comprise at least seizing an address for the USB device and interaction between the USB device and a user;
    an encryptor associated with the module and configured to encrypt data from one or more USB devices; and
    a decryptor associated with the module and configured to decrypt encrypted data that is intended for us by a USB device.

2. The system of claim 1, wherein the security module is located at a point in a USB system where there is no programmatic access to USB data in an unencrypted form.

3. The system of claim 1, wherein the security module is configured to apply encryption and decryption on a device-by-device basis.

4. The system of claim 1, wherein the security module is configured to apply encryption and decryption on a device-by-device basis, and further comprising a table having entries that indicate, on a device-by-device basis, where encryption and decryption is to be applied.

5. The system of claim 1 further comprising a key service processor associated with the security module and configured to provide one or more keys for the encryptor and/or decryptor.

6. The system of claim 1 further comprising a key service processor associated with the security module and configured to provide one or more keys for the encryptor and/or decryptor, the key service processor comprising a callable interface that can be called to set up which devices are to be secured through encryption and decryption.

7. One or more computer-readable media having computer-executable instructions embodying the USB security module of claim 1.

8. An in-line device embodying the USB security module of claim 1.

9. A USB hub embodying the USB security module of claim 1.

10. A USB host controller embodying the USB security module of claim 1.

11. The system of claim 1, wherein the security module is configured to produce authentication data which can be associated with and used to authenticate the data that the security module processes.

12. A system comprising:
a memory;
a processor coupled to the memory;
a USB security module configured to process data associated with the USB transfers;
an encryptor associated with the module and configured to encrypt data from one or more USB devices that have been seized, wherein seizing indicates that data traffic associated with a USB device must be associated with trusted software and establishing a secure tunnel to send the data traffic to and from the one or more USB devices, and wherein steps utilized to seize the one or more USB devices comprise at least seizing an address for the USB device and interaction between the USB device and a user; and
a decryptor associated with the module and configured to decrypt encrypted data that is intended for use by a seized USB device.

13. The system of claim 12, wherein the security module is located at a point in a USB system where there is no programmatic access to USB data in an unencrypted form.

14. The system of claim 12, wherein the security module is configured to apply encryption and decryption on a device-by-device basis.

15. The system of claim 12, wherein the security module is configured to apply encryption and decryption on a device-by-device basis, and further comprising a table having entries that indicate, on a device-by-device basis, where encryption and decryption is to be applied.

16. The system of claim 12 further comprising a key service processor associated with the security module and configured to provide one or more keys for the encryptor and/or decryptor.

17. The system of claim 12 further comprising a key service processor associated with the security module and configured to provide one or more keys for the encryptor and/or decryptor, the key service processor comprising a callable interface that can be called to set up which devices are to be secured through encryption and decryption.

18. One or more computer-readable media having computer-executable instructions embodying the USB security module of claim 12.

19. An in-line device embodying the USB security module of claim 12.

20. A USB hub embodying the USB security module of claim 12.

21. A USB host controller embodying the USB security module of claim 12.

22. The system of claim 12, wherein the security module is configured to produce authentication data which can be associated with and used to authenticate the data that the security module processes.

23. A USB Host Controller comprising:
a memory;
a processor coupled to the memory;
a security module configured to process data associated with USB transfers and to determine if one or more USB devices have been seized, wherein seizing indicates that data traffic associated with a USB device must be associated with trusted software and establishing a secure tunnel to send the data traffic to and from the one or more USB devices, and wherein steps utilized to seize the one or more USB devices comprise at least seizing an address for the USB device and interaction between the USB device and a user;
an encryptor associated with the module and configured to encrypt data from one or more USB devices;
a decryptor associated with the module and configured to decrypt encrypted data that is intended for use by a USB device; and
a table having entries that indicate, on a device-by-device basis, where encryption and decryption is to be applied.

24. The USB Host Controller of claim 23 further comprising a key service processor associated with the security module and configured to provide one or more keys for the encryptor and/or decryptor.

25. The USB Host Controller of claim 23 further comprising a key service processor associated with the security module and configured to provide one or more keys for the encryptor and/or decryptor, the key service processor comprising a callable interface that can be called to set up which devices are to be secured through encryption and decryption.

26. The USB Host Controller of claim 23, wherein the security module is configured to apply encryption and decryption using at least one stream cipher.

27. The USB Host Controller of claim 23, wherein the security module is configured to produce authentication data which can be associated with and used to authenticate the data that the security module processes.

28. A USB Hub comprising:
a memory;
a processor coupled to the memory;
a security module configured to process data associated with USB transfers and to determine if one or more USB devices have been seized, wherein seizing indicates that data traffic associated with a USB device must be associated with trusted software and establishing a secure tunnel to send the data traffic to and from the one or more USB devices, and wherein steps utilized to seize the one or more USB devices comprise at least seizing an address for the USB device and interaction between the USB device and a user;
an encryptor associated with the module and configured to encrypt data from one or more USB devices;
a decryptor associated with the module and configured to decrypt encrypted data that is intended for use by a USB device; and
a table having entries that indicate, on a device-by-device basis, where encryption and decryption is to be applied.

29. The USB Hub of claim 28 further comprising a key service processor associated with the security module and configured to provide one or more keys for the encryptor and/or decryptor.

30. The USB Hub of claim 28 further comprising a key service processor associated with the security module and configured to provide one or more keys for the encryptor and/or decryptor, the key service processor comprising a callable interface that can be called to set up which devices are to be secured through encryption and decryption.

31. The USB Hub of claim 28, wherein the security module is configured to apply encryption and decryption using at least one stream cipher.

32. The USB Hub of claim 28, wherein the security module is configured to produce authentication data which can be associated with and used to authenticate the data that the security module processes.

33. A method comprising:
receiving data that is associated with a USB hardware device;
determining whether the received data is associated with a USB hardware device that is intended to be secure, wherein said determining includes determining if the USB hardware device has been seized, and wherein seizing indicates that data traffic associated with the USB hardware device must be associated with trusted software and establishing a secure tunnel to send the data traffic to and from the one or more USB devices, and wherein steps utilized to seize the one or more USB devices comprise at least seizing an address for the USB hardware device and interaction between the USB hardware device and a user; and
if the USB hardware device is intended to be secure, then encrypting or decrypting the data as appropriate.

34. The method of claim 33, wherein the act of receiving is performed by an entity at which there is no programmatic access to the data by a client application executing on a host computer system.

35. The method of claim 33, wherein the act of determining is performed by accessing a table that contains entries that identify, on a device-by-device basis, which devices are to be secure.

36. The method of claim 33, wherein the acts of encrypting or decrypting are performed by a USB host controller.

37. The method of claim 33, wherein the acts of encrypting or decrypting are performed by one or more interfaces on said USB device.

38. The method of claim 33, wherein the acts of encrypting or decrypting are performed by a USB in-line device.

39. The method of claim 33, wherein the acts of encrypting or decrypting are performed by a USB hub.

40. The method of claim 33, wherein the acts of encrypting or decrypting are performed using a stream cipher.

41. The method of claim 33 further comprising producing authentication data for the data that is received, and associating the authentication data with the received data.

42. One or more computer-readable media having computer-readable instructions which, when executed by one or more processors, cause the one or more processors to implement the method of claim 33.

43. A system comprising:
a memory;
a processor coupled to the memory;
means for processing data associated with USB transfers;
means for determining if one or more USB devices have been seized, wherein seizing indicates that data traffic associated with a USB device must be associated with trusted software and establishing a secure tunnel to send the data traffic to and from the one or more USB devices, and wherein steps utilized to seize the one or more USB devices comprise at least seizing an address for the USB device and interaction between the USB device and a user;
means for encrypting data from one or more USB devices and being employable on a device-by-device basis;
means for decrypting data that is intended for use by a USB device and being employable on a device-by-device basis; and
said means for encrypting and means for decrypting being disposed at a location where there is no direct programmatic access by applications executing on a host computer.

44. The system of claim 43 further comprising means for determining whether encryption or decryption is to be applied to a particular device.

45. The system of claim 43 further comprising means for authenticating data that is processed for the USB transfers.

46. The system of claim 43, wherein all of said recited means are embodied in a USB Host Controller.

* * * * *

UNITED STATES PATENT AND TRADEMARK OFFICE
CERTIFICATE OF CORRECTION

| | | |
|---|---|---|
| PATENT NO. | : 7,478,235 B2 | Page 1 of 1 |
| APPLICATION NO. | : 10/187259 | |
| DATED | : January 13, 2009 | |
| INVENTOR(S) | : Paul England et al. | |

It is certified that error appears in the above-identified patent and that said Letters Patent is hereby corrected as shown below:

In column 5, line 54, after "drive" insert -- 230, --.

Signed and Sealed this
Third Day of May, 2011

David J. Kappos
*Director of the United States Patent and Trademark Office*